No. 641,898. Patented Jan. 23, 1900.
T. SHERWOOD.
TURNBUCKLE.
(Application filed June 26, 1899.)
(No Model.)
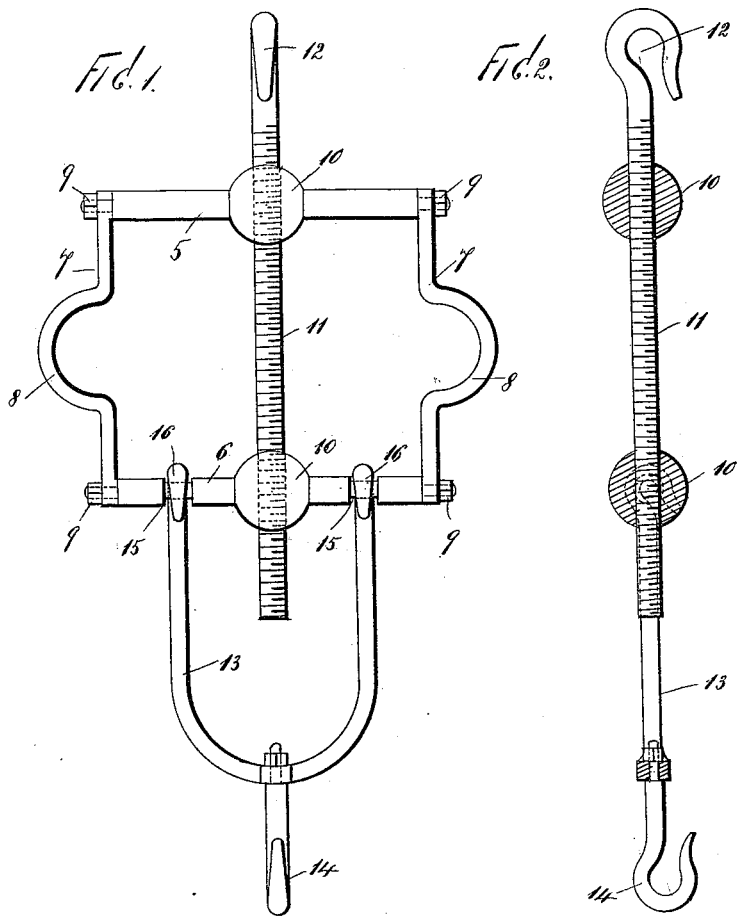
WITNESSES
John Buckler,
F. A. Stewart.
INVENTOR
Thomas Sherwood,
BY
Edgar Tate & Co
ATTORNEYS.

UNITED STATES PATENT OFFICE.

THOMAS SHERWOOD, OF BELCHERTOWN, MASSACHUSETTS.

TURNBUCKLE.

SPECIFICATION forming part of Letters Patent No. 641,898, dated January 23, 1900.

Application filed June 26, 1899. Serial No. 721,863. (No model.)

*To all whom it may concern:*

Be it known that I, THOMAS SHERWOOD, a citizen of the United States, residing at Belchertown, in the county of Hampshire and State of Massachusetts, have invented certain new and useful Improvements in Turnbuckles, of which the following is a full and complete specification, such as will enable those skilled in the art to which it appertains to make and use the same.

This invention relates to turnbuckles for use in connection with hoisting apparatus and for similar purposes; and the object thereof is to provide an improved device of this class which is simple in construction and operation and which is provided with a longitudinally-adjustable suspending-hook and the parts of which are easily detachable.

The invention is fully disclosed in the following specification, of which the accompanying drawings form a part, in which—

Figure 1 is a plan view of my improved turnbuckle, and Fig. 2 a central longitudinal section.

In the drawings forming part of this specification the separate parts of my improvement are designated by the same numerals of reference in each of the views, and in the practice of my invention I provide a frame comprising parallel top and bottom bars 5 and 6, with the ends of which are detachably connected side bars 7. The side bars 7 are preferably provided with outwardly-directed loop-shaped handles 8, and the top and bottom bars 5 and 6 are reduced at the ends and passed through corresponding eyelets or openings in the side bars 7, and said side bars are connected with said top and bottom bars and held in place by nuts 9. The top and bottom bars are enlarged centrally, as shown at 10, and passed centrally therethrough is a screw-threaded shaft 11, provided at its upper or outer end with a hook 12, and said shaft is longitudinally adjustable in the block, as will be readily understood.

The lower bar 6 of the frame is provided with a yoke 13, which is detachably connected therewith, and said yoke is provided with a hook 14. In order to connect the yoke 13 with the bar 6, the said bar is preferably provided at each side of the center thereof with reduced portions 15, and the opposite sides of the yoke 13 are provided at their ends with hooks 16, which are adapted to engage with said reduced portions. This construction enables the yoke 13 to turn freely on the bar 6 and prevents the longitudinal movement of said yoke on said bar.

The hook 14 is swiveled to the yoke 13, and the shaft 11 may be of any desired length, and the distance between the hooks 12 and 14 may thus be regulated as desired, and by reason of the fact that the yoke 13 is adapted to turn on the bar 6 the turnbuckle is easily manipulated and may be conveniently connected with ropes, cables, or other suspending devices.

The entire device is simple in construction and operation and perfectly adapted to accomplish the result for which it is intended, and it will be apparent that changes in and modifications of the construction described may be made without departing from the spirit of my invention or sacrificing its advantages.

Having fully described my invention, I claim as new and desire to secure by Letters Patent—

1. A device of the class described, comprising a frame, a screw-threaded and adjustable shaft passed longitudinally therethrough and provided at one end with a hook, and a yoke connected with said frame and adapted to turn thereon in line with said shaft, said yoke being provided with a hook, substantially as shown and described.

2. A device of the class described, comprising a frame composed of parallel bars, side bars detachably connected therewith, a screw-threaded shaft passed longitudinally through said frame or through said parallel bars and provided at one end with a hook, and a yoke connected with and adapted to turn on one of said parallel bars in line with said shaft, said yoke being provided with a hook, substantially as shown and described.

3. A device of the class described, comprising a frame composed of separate detachable parts, a screw-threaded shaft passed through said frame and provided at one end with a hook, and a yoke connected with said frame and adapted to turn thereon in line with said shaft, said yoke being provided with a hook, substantially as shown and described.

In testimony that I claim the foregoing as my invention I have signed my name, in presence of the subscribing witnesses, this 22d day of June, 1899.

THOMAS SHERWOOD.

Witnesses:
FERNANDO G. SHAW,
WILLIAM A. SNOW.